July 21, 1964
P. C. GOLDMARK
3,142,060
AUTOMATIC JAMMING SYSTEM
Filed June 3, 1955
2 Sheets-Sheet 1
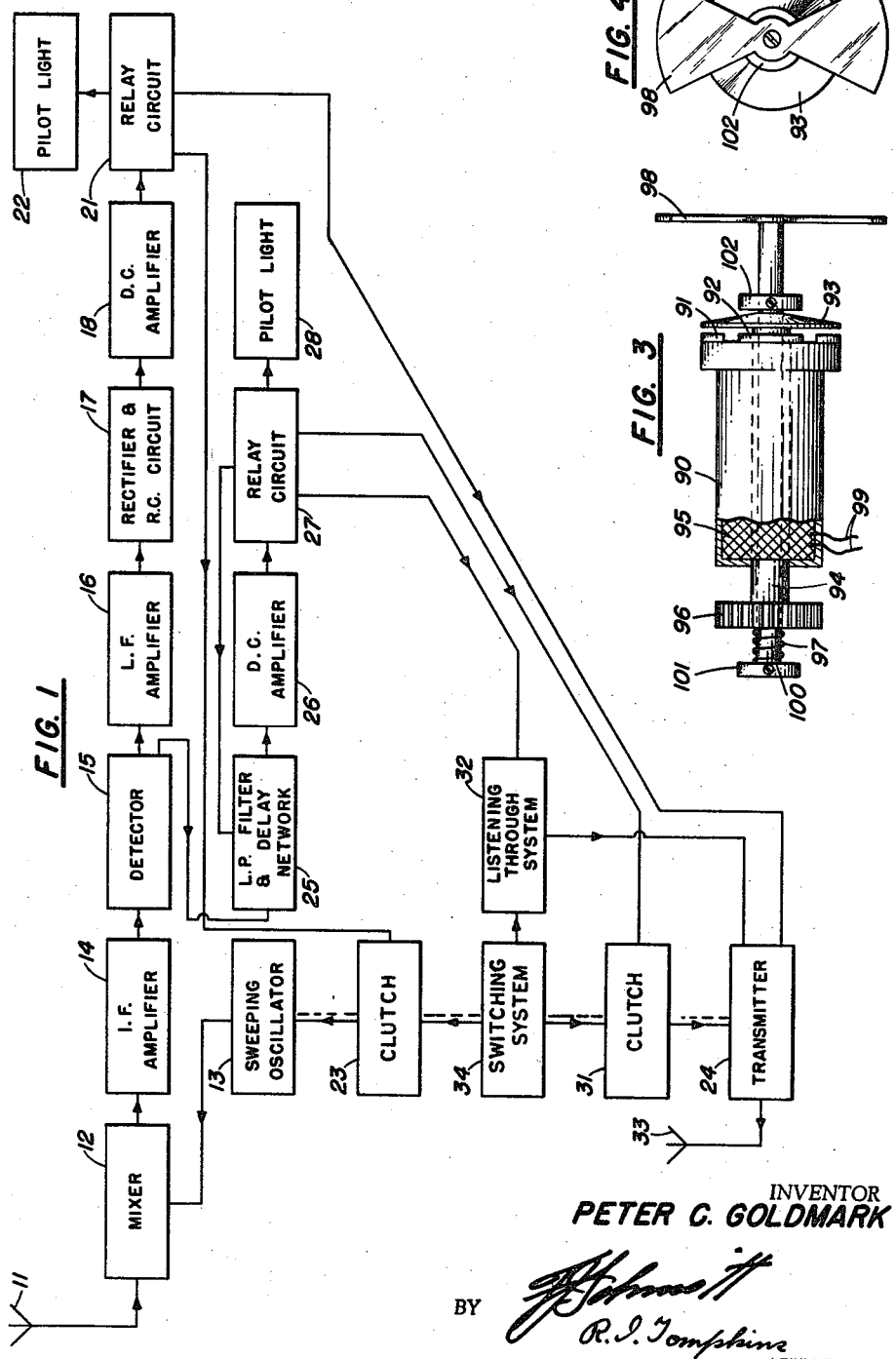
INVENTOR
PETER C. GOLDMARK
BY
ATTORNEYS

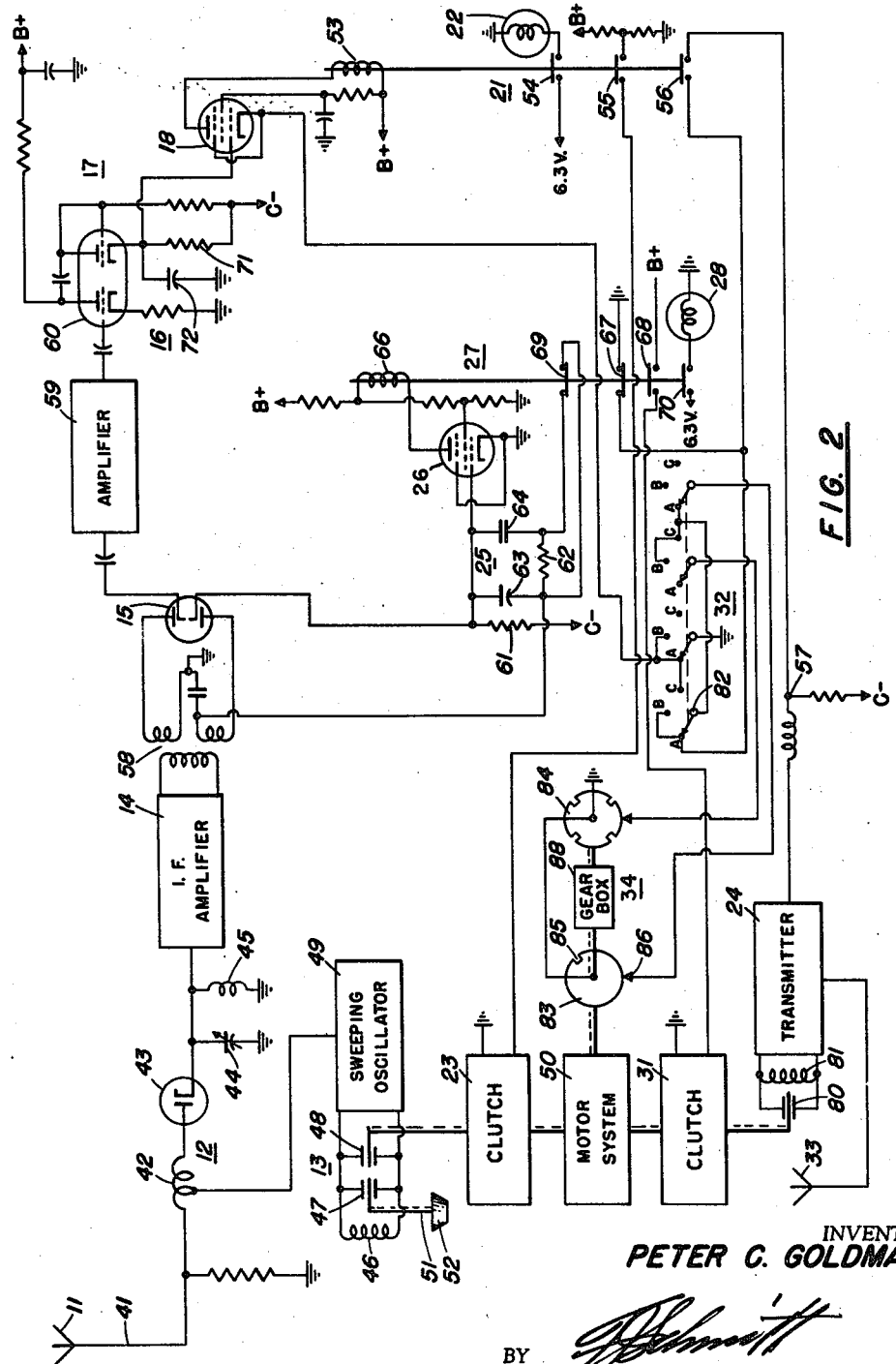

United States Patent Office 3,142,060
Patented July 21, 1964

3,142,060
AUTOMATIC JAMMING SYSTEM
Peter C. Goldmark, New York, N.Y., assignor, by mesne assignments, to the United States of America as represented by the Secretary of the Navy
Filed June 3, 1955, Ser. No. 513,170
9 Claims. (Cl. 343—18)

The present invention relates to an automatic jamming system and more particularly to an automatic jamming system capable of jamming a signal that changes frequency in a desultory fashion.

Present day war activities are, to a great extent, dependent on information obtained from radar equipment. In recognition of this, much work has been and is being done to develop systems which can deprive an adversary of the use of his radar. Most of these systems are jammers, i.e. they transmit signals on the same wavelength on which the enemy radar is operating and thereby override the echo signals containing the desired intelligence. The enemy may change the operating frequency of his radar from time to time to avoid jamming or for other reasons, and thus for effective jamming the frequency of the jamming transmitter must follow this change.

The present invention is a system which seeks out the frequency of the signal which is to be jammed, and transmits a jamming signal at that frequency. This system has an additional feature which is termed "listening through." The "listening through" components interrupt the jamming signal periodically and permit the jamming receiver to "listen through," i.e. to check to see if the enemy radar signal is at the same frequency and if it is, the transmitter than continues to jam until the next "listening through" period. If the frequency of the enemy radar has changed, this system will start searching the spectrum again and will lock on and jam the next signal which it encounters.

Accordingly an object of the present invention is the provision of a system for searching a portion of the electromagnetic spectrum and for detecting the frequency of a transmitted signal.

Another object is to provide a system for seeking out the frequency of a transmitted signal and for transmitting a signal at the same frequency.

A further object of the present invention is the provision of a system for seeking out the frequency of a transmitted signal and for sending out a jamming signal.

Still another object is to provide a system for jamming a signal which periodically checks to see if the signal has changed frequency.

A still further object of the present invention is the provision of a system for jamming a signal which follows the signal if it changes frequency.

Other objects and many of the attendant advantages of this invention will be readily appreciated as the same becomes better understood by reference to the following detailed description when considered in connection with the accompanying drawings wherein:

FIG. 1 shows a block diagram of a preferred embodiment of this invention.

FIG. 2 illustrates a schematic operating diagram of a circuit suitable for performing the functions set out in the block diagram of FIG. 1.

FIG. 3 shows a side view, partly in section, of a brake and variable capacitor assembly suitable for use in the circuit of FIG. 2.

FIG. 4 illustrates an end view of the assembly of FIG. 3.

Referring now to the drawings, wherein like reference characters designate like or corresponding parts throughout the several views, there is shown in FIG. 1 (which illustrates a preferred embodiment) an antenna 11 connected to mixer 12 which mixes the signal received from antenna 11 and the signal produced by sweeping oscillator 13. I.F. amplifier 14 amplifies the mixed signal and it is then detected by detector 15. Low frequency amplifier 16 amplifies the detected signal and rectifier and resistance-capacitance circuit 17 rectifies the signal and stores it in a resistance-capacitance circuit. D.C. amplifier 18 is connected to amplify the voltage on the resistance-capacitance circuit and operate relay circuit 21. Relay circuit 21 completes circuits to energize pilot light 22, clutch 23, and transmitter 24. The other output path of detector 15 goes to low pass filter and delay network 25. The output of network 25 is amplified by D.C. amplifier 26 and used to operate relay circuit 27. Relay circuit 27 completes circuits to energize pilot light 28, delay network 25, clutch 31, and the listening through system 32. Switching system 34 (which in the illustrative embodiment of the invention shown in FIG. 2 includes a motor mechanically coupled through clutches 23, 31 to butterfly capacitors in oscillator circuit 49 and transmitter 24, respectively) is employed to give the periodic characteristics necessary for the sweeping components of oscillator 13 and transmitter 24 and also provides this characteristic for listening through system 32. Listening through system 32 in turn provides another control for transmitter 24. The jamming signal emanating from transmitter 24 is transmitted via antenna 33. In FIG. 2, which shows the more intricate components in circuit diagram form of an exemplary system capable of performing the operations specified in FIG. 1, antenna 11 is connected to mixer 12 by a properly terminated transmission line 41. In the mixer 12, inductance 42 is connected in series with diode 43 and forms a series resonant circuit in addition to a mixing circuit and thereby tunes the incoming signal broadly to the center of the tuning range. Capacitor 44 serves as the RF bypass at the diode output and also tunes with inductor 45 to the frequency of the I.F. amplifier. Sweeping oscillator 13 has a variable tank circuit comprising an inductance 46 is parallel with variable capacitors 47 and 48. The oscillator portion 49 includes the oscillator components other than the tank circuit, such as the power source, the coupling capacitors, the regenerative element, and etc. Motor system 50 of switching system 34 drives the variable element of capacitor 48, thus providing the sweep. Shaft 51 and knob 52 control variable capacitor 47 for manual tuning purposes and thereby determine the frequency about which the sweep is made. Transformer 58 transforms the output of I.F. amplifier 14 to double diode detector 15. Amplifier 59 and the left-hand section of tube 60 and associated circuit elements compose low frequency amplifier 16. The prior amplification is sufficient to saturate the left portion of tube 60 for all signals above one millivolt. The second half of tube 60, used as a diode, in cooperation with the RC circuit composed of resistor 71 and capacitor 72, operates as a peak voltmeter and comprises rectifier and RC circuit 17. The voltage across capacitor 72 is amplified by D.C. amplifier 18 which is normally biassed to cutoff. When sufficient current flows in the plate circuit of amplifier 18, relay coil 53 is energized to operate relay circuit 21. Relay circuit 21 has three sets of contacts: 54, 55 and 56. Contacts 54 complete a circuit to energize pilot light 22. Contacts 55 close a circuit to energize clutch 23 which stops the sweep movement of capacitor 48. Contacts 56 close and put the transmitter 24 into operation by removing the blocking bias from C—, i.e. terminal 57 is put at ground potential. The other output of detector 15 goes to low pass filter and delay network 25 consisting of resistors 61 and 62 and capacitors 63 and 64. The output of this network is connected to D.C. amplifier 26. The plate circuit of D.C. amplifier 26 energizes relay coil 66 of relay circuit 27. There are four sets of contacts in this relay circuit: 67, 68, 69 and 70. Contacts 67 open and thereby transfer the control of the potential at terminal 57 to the listening through system 32. Contacts 68 close and clutch 31 is energized to stop the sweeping action of the frequency control of transmitter 24. Contacts 69 open and introduce a discharge delay at the grid of tube 65. Contacts 70 close to energize pilot light 28. Transmitter 24 has a frequency control section very similar to that of oscillator 13. This frequency control consists of a variable capacitor 80, which is periodically varied by motor system 50 through clutch 31, and an inductor 81 in parallel with capacitor 80. Ganged switch 82 of listening through system 32 permits the selection of two different listening through periods, from position A and position B; position C forces the system to release and start searching for a signal again. Motor system 50, which drives the sweeping capacitors, is also geared to two keying cams 83 and 84 which together with motor system 50 comprise switching system 34. Cams 83, 84 provide a periodically interrupted ground connection for terminal 57 when switch 82 is in position A or B respectively. Cam 84 is geared to rotate at much higher rate than cam 83 by means of gear box 88. When switch 82 is in position A, cam 83 connects terminal 57 to ground except when recess 85 is opposite contact 86. When switch 82 is in position B, cam 84 similarly connects terminal 57 to ground. For switch position C, cam 84 is connected to interrupt the cathode circuit of tube 18. In the clutch and variable capacitor assembly shown in FIG. 3, the clutch comprises a cylindrical electromagnet having a casing 90 with concentric poles 91 and 92 which attract an armature 93. Armature 93 is attached to a hollow shaft 94 passing through the center of the cylindrical electromagnet. The magnet windings 95, which are energized through leads 99, are placed between the poles 91 and 92. The shaft 94 is driven by a motor through gear 96. The hollow shaft 94 serves as a bearing for a small solid shaft 97 which carries the rotor plates 98 of a "butterfly" capacitor. Shafts 94 and 97 are connected by friction. Because the rotor shaft 97 and plates 98 are very light there is practically no inertia. Components 101 and 102 are collars and 100 is a spring. The shape of the rotor plates 98 is shown better in FIG. 4, which is an end view.

In operation, initially both variable capacitors 48 and 80 (FIG. 2) are driven in a cyclic manner by motor system 50. The incoming signal is received by antenna 11 and is mixed with the variable frequency output of oscillator 13. When the mixed result is equal in frequency to the intermediate frequency, the signal passes through the filter consisting of capacitor 44 and inductor 45, is amplified by amplifier 14, detected by detector 15, amplified again by amplifier 59 and the left-hand portion of tube 60 and rectified by the right-hand portion of tube 60. The resultant signal charges capacitor 72, raising the grid of tube 18 above cutoff thus permitting tube 18 to conduct. Conduction of tube 18 energizes relay coil 53 to operate relay circuit 21, and hence contacts 54, 55 and 56. Contacts 54 close and light a pilot light 22 indicating that a signal is being received. Contacts 55 close and thereby the clutch 23 is operated, thus locking the receiver tuning to the detected signal. Contacts 56 close and put transmitter 24 into operation by removing the blocking bias from C—. While transmitter 24 is in a standby condition, its sweep condensor 80 is rotating. When the transmitter is unblocked by contacts 56 due to an incoming signal, the output from antenna 33 will then be a cyclically varying jamming signal. When this jamming signal encounters the same frequency as the initial incoming signal, the jamming signal also passes through I.F. amplifier 14. The initial incoming signal is at a relatively low energy level and is prevented from triggering tube 65 by means of low pass filter 25. The jamming signal, however, due to the proximity of the transmitting antenna 33, is of a very high intensity and is sufficient to energize D.C. amplifier 26 and thus relay coil 66 and contacts 67, 68, 69 and 70. Contacts 70 close and energize another pilot light 28 indicating that the transmitter is jamming on the received frequency. Contacts 68 close and allow the transmitter clutch 31 to operate in a manner similar to that of the receiver and thus lock the transmitter to the frequency of the incoming signal to which the receiver is already locked. Contacts 69 open and introduce a discharge delay at the grid of tube 65 so that the transmitter relay contacts will not open and start the transmitter returning during the listening through periods. The delay resistor 62 cannot be left in the circuit during the tuning period because it would prevent the relay from acting in time when the transmitter sweep capacitor 80 tunes through the frequency of the incoming signal. Contacts 67 open and allow the keying for the listening through system to operate. There are three positions of switch 82 any one of which may be used. In position A, the blocking bias C— is applied to transmitter 24 whenever the recess 85 on cam 83 is opposite contact 86, for then ground potential is no longer applied to terminal 57. If the incoming signal is at the same frequency then relay coil 53 is energized and the jamming continues until the next listen through period. If the incoming signal has changed frequency, it is filtered out in an early stage and capacitor 72 discharges and tube 18 cuts off thereby de-energizing relay coil 53. This results in the opening of contacts 54, 55 and 56. Clutch 23 is deenergized and the sweep circuit of oscillator 13 commences operation. Transmitter 24 is deenergized, and thus relay circuit 27 falls out and the system is placed in its initial condition of searching for a signal. In position B, cam 84 is in the circuit instead of cam 83. The operation is the same as in position A with the exception that the listening through periods occur more frequently since cam 84 is geared to rotate at a higher rate than cam 83 and has more recesses. In position C, cam 84 is placed in the cathode circuit of tube 18 and thus the plate current and subsequent energization of relay coil 53 is cutoff four times for every cycle of cam 84. As explained in the discussion of position A, when relay coil 53 is deenergized the whole system reverts to the original signal seeking condition. The system will lock on the next signal it encounters while tuning, which may be the same one from which the system has just been released or may be a new signal from a different source. The operation of the clutch and variable capacitor assembly of FIGS. 3 and 4 takes place upon an energization of winding 95. The current in winding 95 in cooperation with magnetic poles 91 and 92 attracts armature 93. Armature 93 is secured to shaft 94, and thus the shaft moves with the armature and the gear 96 then disengages with its driving gear. Since there is no other driving force, when gear 96 disengages the whole assembly comes to rest. There is little movement due to inertial effects since the assembly is composed of low mass components. Spring 101 maintains gear 96 in an engaging position, but the force of the magnet upon armature 93 is more powerful and overcomes the force of the spring.

An automatic jamming system has been disclosed for seeking out a signal and for transmitting a jamming signal on the same frequency. If the signal which is being jammed changes frequency, the jammer, after a short delay, automatically ceases operation on the old frequency and seeks out the wavelength to which the signal has changed and starts jamming at that frequency.

Obviously many modifications and variations of the present invention are possible in the light of the above teachings. It is therefore to be understood that within the scope of the appended claims the invention may be practiced otherwise than as specifically described.

What is claimed is:

1. A system for automatically jamming a received electromagnetic wave comprising receiver antenna means for receiving said electromagnetic wave, sweeping oscillator means for producing a wave of cyclically varying frequency, mixer means connected for producing a mixed output of said electromagnetic wave and said cyclically varying wave, filter means connected to said mixer means for producing an output voltage when the output from said mixer means is of a predetermined frequency, control means connected to said filter means to stop the sweep of said sweeping oscillator means when said mixed signal is at said frequency, transmitter means energized by said control means for producing an electromagnetic wave at the frequency of said received electromagnetic wave, and means for periodically interrupting the operation of said transmitter means, whereby said system can test to see if said received electromagnetic wave has changed frequency.

2. A system for automatically jamming a received wave, comprising sweeping transmitter means for transmitting a cyclically varying wave, sweeping oscillator means for producing a cyclically varying signal, receiver means, mixer means for producing a mixed output of said received wave and said cyclically varying signal, intermediate frequency means connected to stop the sweeping of said oscillator means and to energize said transmitter means when said mixed output is at the intermediate frequency, low pass filter means connected to said intermediate frequency means and to said transmitter means to stop the sweep of said transmitter means when said transmitted wave is at the frequency of said received wave, means for periodically deenergizing said transmitter means.

3. A system for automatically jamming a received wave, comprising: a transmitter for transmitting a jamming wave, a first tank circuit for controlling the output frequency of said transmitter, first oscillating means connected to cyclically vary the tuning of said first tank circuit, oscillator means for producing an oscillating signal, a second tank circuit for controlling the output frequency of said oscillator means, second oscillating means connected to cyclically vary the tuning of said second tank means, receiver means, mixer means for producing a mixed signal of said received wave and said oscillating signal, intermediate frequency means energized by said mixer means and connected to said second oscillating means and to said transmitter to render said second oscillating means inoperative and to energize said transmitter when said mixed signal is at the intermediate frequency, low pass filter means connected to said intermediate frequency means and to said second oscillating means to render said first oscillating means inoperative when said transmitted wave is at the frequency of said received wave, means for periodically deenergizing said transmitter, and delay network means for energizing said low pass filter means during said periods when said transmitter is de-energized to insure that said first oscillating means is not enabled.

4. A system for automatically jamming a received wave comprising in combination: a transmitter for transmitting jamming wave, first variable frequency tank circuit means for controlling the frequency of said jamming wave, first oscillating means connected to cyclically vary the tuning of said first tank circuit means, means for stopping the operation of said first oscillating means, oscillator means for producing an oscillating signal, second variable frequency tank circuit means for controlling the frequency of said oscillating signal, second oscillating means connected to cyclically vary the tuning of said second tank circuit means, means for stopping the operation of said second oscillating means, receiver means, mixer means for producing a mixed signal of said received wave and said oscillating signal, intermediate frequency means connected to sad mixer means for producing an output signal when said mixed signal is at the intermediate frequency, first relay means energized by said output signal to energize said second oscillating means, stopping means and said transmitter, second relay means connected to said intermediate frequency means, said second relay means being inoperative except when the output of the intermediate frequency is of a higher magnitude than that resulting from the reception of a wave from another transmitter, said second relay means when operated energizing said first oscillating means stopping means, and means for periodically de-energizing said transmitter.

5. The combination of claim 4 wherein said transmitter de-energizing means comprise periodically actuated switching means connected to said first relay means and to said transmitter for selectively de-energizing said first relay means or only said transmitter.

6. A system for automatically jamming a received wave comprising in combination: a transmitter for transmitting a jamming wave, a first tank circuit having a first variable capacitor for controlling the output frequency of said jamming wave, a first shaft for said variable capacitor by which the capacitance is varied, first motor means for cyclically varying said first shaft, first electro-magnetic clutch means for disengaging said first motor means from said first shaft, oscillator means for producing an oscillating signal, a second tank circuit having a variable capacitor for controlling the frequency of said oscillating signal, a second shaft for said variable capacitor of said second tank circuit by which the capacitance is varied, second motor means for cyclically varying said second shaft, second electro-magnetic clutch means for disengaging said second motor means from said second shaft, receiver means, mixer means connected to said receiver means and to said oscillator means for producing an output signal when said mixed signal is at a selected frequency, first relay means connected to said mixer means and to said second electro-magnetic clutch for energizing said second electro-magnetic clutch means and said transmitter when said mixer means produces an output, second relay means connected to said mixer means and to said first electro-magnetic clutch means to energize said first electro-magnetic clutch means, when said mixer means produces an output greater in magnitude than that required to operate said first relay means to periodically de-energize said transmitter for a short period of time, and means coupled to said second relay means to prevent operation thereof during said period.

7. The system of claim 6 wherein said first and second electro-magnetic clutch means each comprise: a cylindrical electromagnet having concentric poles, a hollow shaft passing through the center of the cylindrical electromagnet, a disc armature attached to said hollow shaft and positioned to be attracted by the concentric poles when said electromagnet is energized, a gear fixed to said hollow shaft and adapted to be engaged by gear means on said motor means for transmitting a rotational force to said hollow shaft from said motor means, said hollow shaft serving as a bearing for said capacitance varying shaft, whereby said capacitance varying shaft follows the movement of said hollow shaft through frictional engagement, said gear being disengaged from said gear means when said electromagnet is de-energized.

8. A system for automatically jamming a received wave comprising in combination: a transmitter for transmitting a jamming wave, a first tank circuit having a first variable capacitor with a rotatable plate for controlling the output frequency of said jamming wave, a first shaft for rotating the rotatable plate of said first variable capacitor, first motor means, a first electro-magnetic clutch coupling said first motor means to said first shaft, oscillator means for producing an oscillating signal, a second tank circuit having a second variable capacitor with a rotatable plate for controlling the frequency of said oscillating signal, a second shaft for rotating the rotatable plate of said second variable capacitor, second motor means, a second electro-magnetic clutch coupling said second motor means to said second shaft receiver means, mixer means coupled to said receiver means and to said oscillator means for producing a mixed signal of said received wave and said oscillating signal, intermediate frequency means connected to said mixer means for producing an output signal when said mixed signal is at the intermediate frequency, a detector connected to said intermediate frequency means to produce a detected signal of said output signal, a first circuit connected to said detector to conduct a portion of said detected signal, a second circuit connected to said detector to conduct the remainder of said detected signal, rectifier means in said first circuit for producing a rectified signal from said detected signal, a resistance-capacitance circuit connected to said rectifier means to be charged by said rectified signal, a first relay circuit connected to said resistance-capacitance circuit to be energized by the charge on said resistance-capacitance circuit, circuit means connecting said first relay circuit to said second electro-magnetic clutch and to said transmitter for energizing said second electro-magnetic clutch and said transmitter, means for periodically deenergizing said transmitter, a low pass filter in said second circuit for blocking all signals except those of a magnitude the same as the jamming signal received from the transmitter, a delay network in said second circuit for producing a slowly decaying voltage on said second circuit, and a second relay circuit connected in said second circuit for energizing said first electro-magnetic clutch, said delay network, and said transmitter de-energizing means when a signal is passed by said low pass filter.

9. A system for automatically jamming a radiated signal comprising: receiver means for receiving radiated signals, transmitter means for transmitting a jamming signal, intermediate frequency means coupled to said receiver means, means coupled to said intermediate frequency means and to said receiver means for locking said receiver means on a radiated signal, means connected to said receiver means to be energized thereby for locking said transmitter on said radiated signal, and means for periodically interrupting the transmitter operation.

References Cited in the file of this patent
UNITED STATES PATENTS

| | | |
|---|---|---|
| 1,453,202 | Stevens | Apr. 24, 1923 |
| 2,418,139 | Preisman | Apr. 1, 1947 |
| 2,514,694 | Chapman | July 11, 1950 |
| 2,703,362 | Strandberg | Mar. 1, 1955 |
| 2,704,323 | Wu | Mar. 15, 1955 |
| 2,708,749 | Schmitt | May 17, 1955 |
| 2,710,935 | Luebking | June 14, 1955 |